United States Patent
Kim et al.

(10) Patent No.: US 9,798,020 B2
(45) Date of Patent: Oct. 24, 2017

(54) METHODS AND SYSTEMS FOR GAIN CALIBRATION OF PET DETECTORS

(71) Applicant: General Electric Company, Schenectady, NY (US)

(72) Inventors: Chang Lyong Kim, Brookfield, WI (US); William Todd Peterson, Sussex, WI (US); Vi-Hoa Tran, Pewaukee, WI (US); Sean Michael Bacon, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 14/830,067

(22) Filed: Aug. 19, 2015

(65) Prior Publication Data
US 2017/0052266 A1 Feb. 23, 2017

(51) Int. Cl.
G01T 1/24 (2006.01)
G01T 7/00 (2006.01)
G01T 1/164 (2006.01)
G01T 1/20 (2006.01)

(52) U.S. Cl.
CPC ............ G01T 7/005 (2013.01); G01T 1/1647 (2013.01); G01T 1/2018 (2013.01); G01T 1/248 (2013.01); G01T 1/249 (2013.01)

(58) Field of Classification Search
CPC ...................................................... G01T 7/005
See application file for complete search history.

(56) References Cited

U.S. PATENT DOCUMENTS

| | | | |
|---|---|---|---|
| 2013/0058458 A1* | 3/2013 | Desaute | G01T 1/185 378/62 |
| 2013/0327932 A1* | 12/2013 | Kim | G01T 1/208 250/252.1 |
| 2015/0168567 A1 | 6/2015 | Kim et al. | |

* cited by examiner

Primary Examiner — Yara B Green
(74) Attorney, Agent, or Firm — McCoy Russell LLP

(57) ABSTRACT

Methods and systems are provided for performing cathode calibration in a detector assembly. In one embodiment, a method comprises adjusting a cathode bias of a detector based on a total number of events occurring in the detector during a time period while maintaining an anode bias at a desired value, the events corresponding to photon energy detected by the detector. In this way, an automated cathode calibration procedure may be applied to calibrate the detector assembly.

18 Claims, 6 Drawing Sheets

METHODS AND SYSTEMS FOR GAIN CALIBRATION OF PET DETECTORS

FIELD

Embodiments of the subject matter disclosed herein relate to non-invasive diagnostic imaging, and more particularly, to gain calibration of Positron Emission Tomography (PET) detectors.

BACKGROUND

PET generates images that represent the distribution of positron-emitting nuclides within the body of a patient. When a positron interacts with an electron by annihilation, the entire mass of a positron-electron pair is converted into two 511-keV photons (also referred to as 511-keV events). The photons are emitted in opposite directions along a line of response (LOR). The annihilation photons are detected by detectors that are placed on both sides of the line of response, in a configuration such as a detector ring. The detectors convert the incident photons into useful electrical signals that can be used for image formation. An image thus generated based on the acquired image data includes the annihilation photon detection information.

Modern PET scanners include detectors such as silicon photomultipliers (SiPMs), wherein the detectors are typically tuned such that data collection is normalized for the energy event that is being detected. As explained earlier, the energy events generated have specific energy signature or targets (such as 511-keV, for example), hence the detectors are calibrated to detect the specific energy signature. The SiPM calibration process is typically performed at the component level (during manufacturing of the detectors, for example), at the system level (when the detector is assembled into the imaging system, for example), or in the field (when an imaging module is replaced by a field service engineer or by a user, for example). The calibration process begins by setting an initial anode and cathode bias, and acquiring a gamma ray data (herein also referred to as image, however the data/image corresponds to raw gamma ray data such as energy, position, and timing data). A user then post-processes the acquired data and checks to see if any events are detected, and if events are not detected, then the bias is slowly increased until events are detected, while stopping each time to post-process the image to check for events. This sequence of acquiring a set of data, post-processing the data and further adjusting the bias based on the post-processed data is continued until a desired energy spectrum is obtained and a corresponding calibration bias is determined. Thus, the entire calibration process can take 30-40 minutes with multiple user interventions. Faster and automated calibration methods are desirable.

BRIEF DESCRIPTION

In one embodiment, a method comprises adjusting a cathode bias of a detector based on a total number of events occurring in the detector during a time period while maintaining an anode bias at a desired value, the events corresponding to photon energy detected by the detector. In this way, by detecting energy events rather than energy spectra, the cathode calibration process may be made faster and automated with minimal user intervention.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 4:
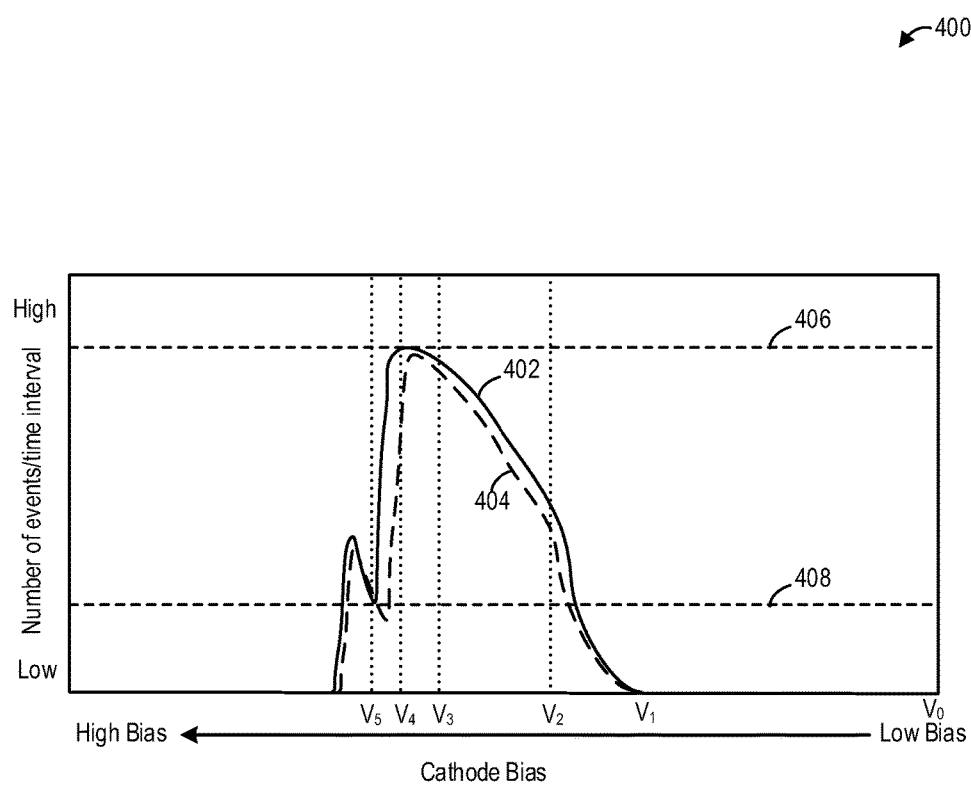
FIG. 4 is an example relationship between total number of events detected by the detector and a cathode bias.
Figure 5:
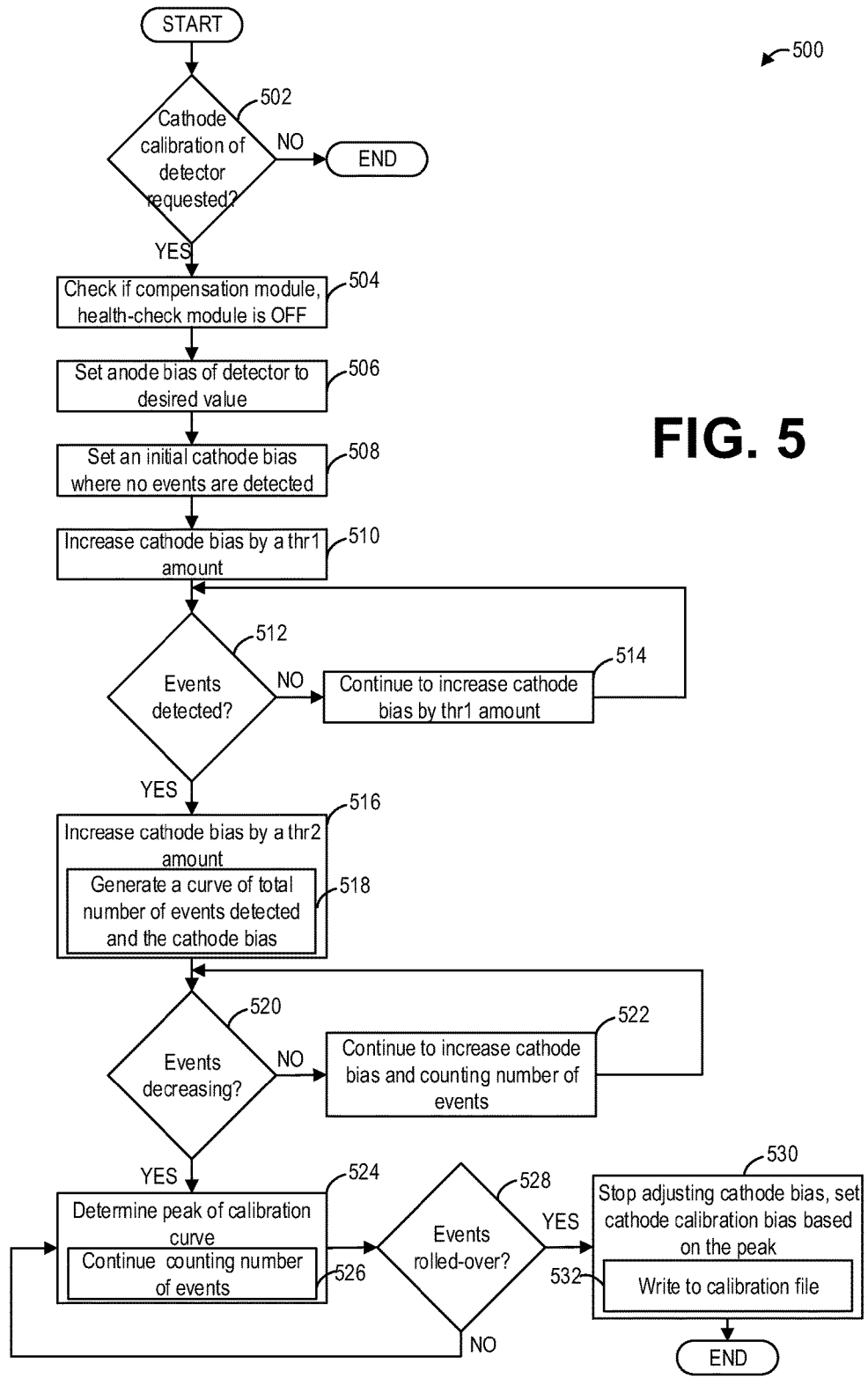
FIG. 5 is a high-level flowchart illustrating an example method for determining a cathode calibration bias of the detector, according to an embodiment of the invention.
Figure 6:
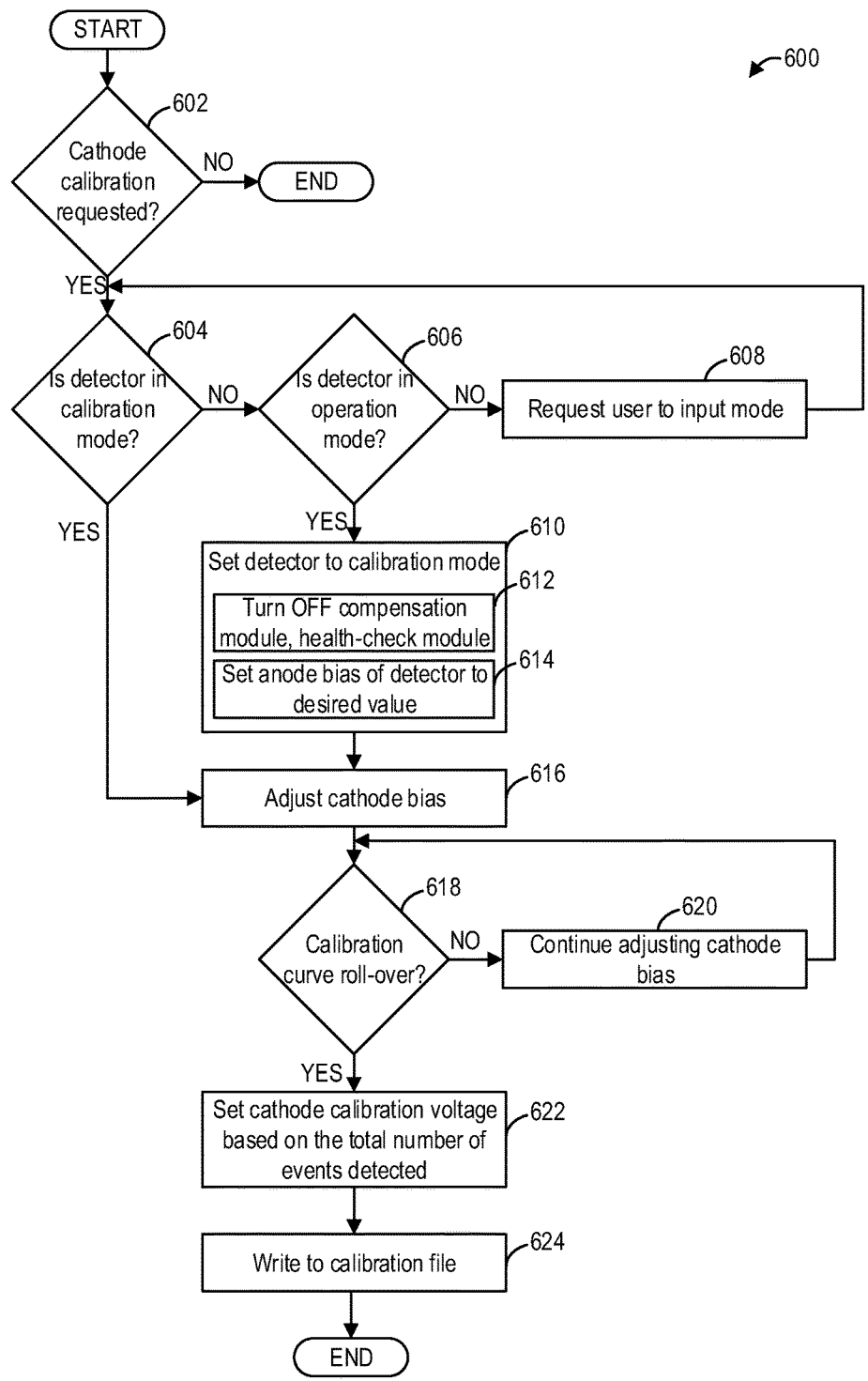
FIG. 6 is a high-level flowchart illustrating an example method for performing cathode calibration when the detector is in calibration mode and in operation mode, according to an embodiment of the invention.

The following description relates to various embodiments of medical imaging systems. In particular, methods and systems are provided for cathode calibration of a detector. An example of a positron emission tomography (PET) imaging system including a detector that may be used to detect energy events in accordance with the present techniques is provided in FIGS. 1-3. As depicted in FIG. 4, a cathode calibration curve may be generated in a measurement window that indicates the relationship between a total number of events detected by the detector and a cathode bias of the detector. For example, as the cathode bias is increased, the number of events detected by the detector begins to increase, and subsequently reaches a roll-over point wherein the events start to move out of the measurement window. Once the roll-over point is reached, the cathode bias may be determined based on the peak location of total events detected, as depicted in FIG. 5. FIG. 6 shows a method for performing the cathode calibration when the detector is in operation mode and in calibration mode. In this way, the detector may be calibrated for detecting energy events.

Though a PET imaging system is described by way of example, it should be understood that the present techniques may also be useful when applied to images acquired using other imaging modalities, such as CT, tomosynthesis, MRI, C-arm angiography, and so forth. The present discussion of a PET imaging modality is provided merely as an example of one suitable imaging modality.

As used herein, the phrase "reconstructing an image" is not intended to exclude embodiments of the present invention in which data representing an image is generated but a viewable image is not. Therefore, as used herein the term "image" broadly refers to both viewable images and data representing a viewable image. However, many embodiments generate, or are configured to generate, at least one viewable image.

Figure 1:
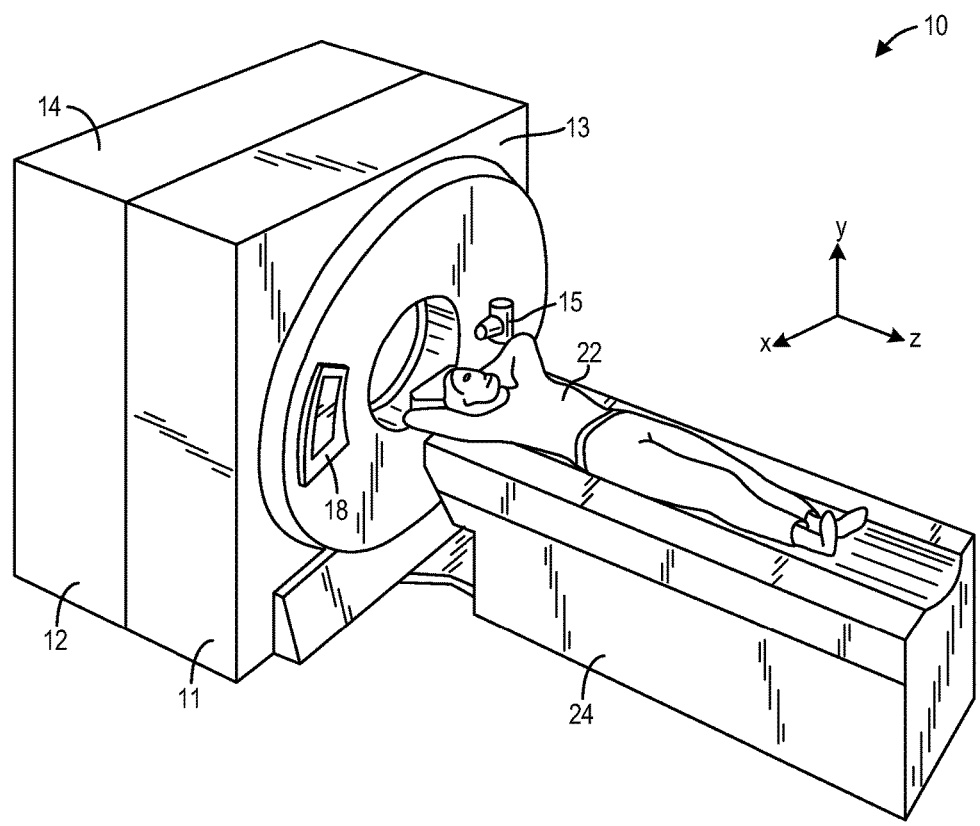
FIG. 1 is a pictorial view of an exemplary multi-modality imaging system according to an embodiment of the invention.
Figure 2:
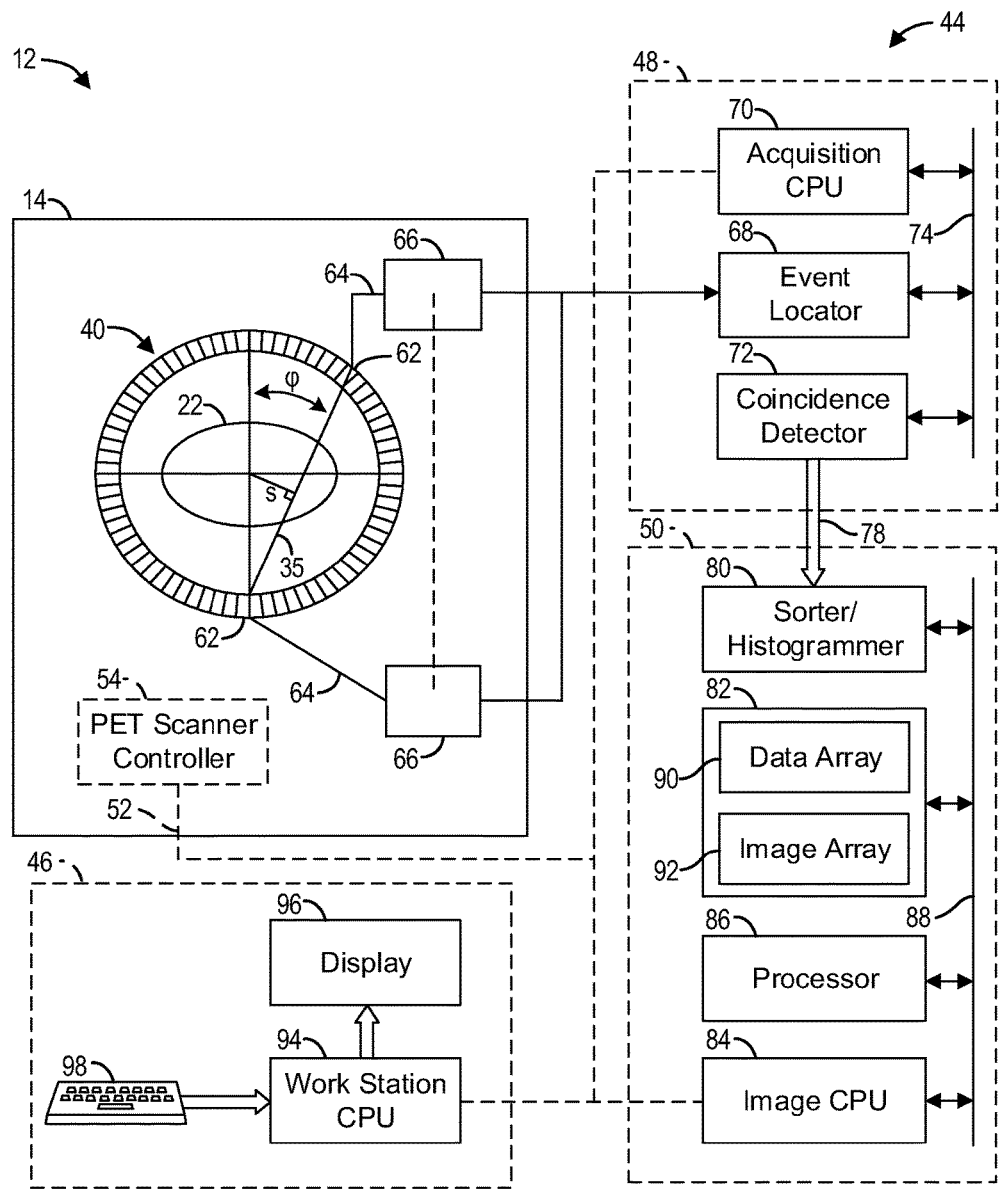
FIG. 2 is a block schematic diagram of an exemplary imaging system with a detector, according to an embodiment of the invention.

Various embodiments of the invention provide a multi-modality imaging system 10 as shown in FIGS. 1 and 2. Multi-modality imaging system 10 may be any type of imaging system, for example, different types of medical imaging systems, such as a Positron Emission Tomography (PET), a Single Photon Emission Computed Tomography (SPECT), a Computed Tomography (CT, an ultrasound system, Magnetic Resonance Imaging (MRI), or any other system capable of generating tomographic images. The various embodiments are not limited to multi-modality medical imaging systems, but may be used on a single modality medical imaging system such as a stand-alone PET imaging system or a stand-alone SPECT imaging system, for example. Moreover, the various embodiments are not limited to medical imaging systems for imaging human subjects, but may include veterinary or non-medical systems for imaging non-human objects.

Referring to FIG. 1, the multi-modality imaging system 10 includes a first modality unit 11 and a second modality unit 12. The two modality units enable the multi-modality imaging system 10 to scan an object or patient in a second modality using the second modality unit 12. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system 10, e.g., the first modality 11 is a CT imaging system 11 and the second modality 12 is a PET imaging system 12. The CT/PET system 10 is shown as including a gantry 13 representative of a CT imaging system and a gantry 14 that is associated with a PET imaging system. As discussed above, modalities other than CT and PET may be employed with the multi-modality imaging system 10.

The gantry 13 includes an x-ray source 15 that projects a beam of x-rays toward a detector array 18 on the opposite side of the gantry 13. Detector array 18 is formed by a plurality of detector rows (not shown) including a plurality of detector elements which together sense the projected x-rays that pass through a medical patient 22. Each detector element produces an electrical signal that represents the intensity of an impinging x-ray beam and hence allows estimation of the attenuation of the beam as it passes through the patient 22. During a scan to acquire x-ray projection data, gantry 13 and the components mounted thereon rotate about a center of rotation.

FIG. 2 is a block schematic diagram of the PET imaging system 12 illustrated in FIG. 1 in accordance with an embodiment of the present invention. The PET imaging system 12 includes a detector ring assembly 40 including a plurality of detector crystals. The PET imaging system 12 also includes a controller or processor 44, to control normalization, image reconstruction processes and perform calibration. Controller 44 is coupled to an operator workstation 46. Controller 44 includes a data acquisition processor 48 and an image reconstruction processor 50, which are interconnected via a communication link 52. PET imaging system 12 acquires scan data and transmits the data to data acquisition processor 48. The scanning operation is controlled from the operator workstation 46. The data acquired by the data acquisition processor 48 is reconstructed using the image reconstruction processor 50.

The detector ring assembly 40 includes a central opening, in which an object or patient, such as patient 22 may be positioned using, for example, a motorized table 24 (shown in FIG. 1). The motorized table 24 is aligned with the central axis of detector ring assembly 40. This motorized table 24 moves the patient 22 into the central opening of detector ring assembly 40 in response to one or more commands received from the operator workstation 46. A PET scanner controller 54, also referred to as the PET gantry controller, is provided (e.g., mounted) within PET system 12. The PET scanner controller 54 responds to the commands received from the operator workstation 46 through the communication link 52. Therefore, the scanning operation is controlled from the operator workstation 46 through PET scanner controller 54.

During operation, when a photon collides with a crystal 62 on a detector ring 40, it produces a scintillation event on the crystal. Each photomultiplier tube or photosensor produces an analog signal that is transmitted on communication line 64 when a scintillation event occurs. A set of acquisition circuits 66 is provided to receive these analog signals. Acquisition circuits 66 produce digital signals indicating the three-dimensional (3D) location and total energy of the event. The acquisition circuits 66 also produce an event detection pulse, which indicates the time or moment the scintillation event occurred. These digital signals are transmitted through a communication link, for example, a cable, to an event locator circuit 68 in the data acquisition processor 48.

The data acquisition processor 48 includes the event locator circuit 68, an acquisition CPU 70, and a coincidence detector 72. The data acquisition processor 48 periodically samples the signals produced by the acquisition circuits 66. The acquisition CPU 70 controls communications on a back-plane bus 74 and on the communication link 52. The event locator circuit 68 processes the information regarding each valid event and provides a set of digital numbers or values indicative of the detected event. For example, this information indicates when the event took place and the position of the scintillation crystal 62 that detected the event. An event data packet is communicated to the coincidence detector 72 through the back-plane bus 74. The coincidence detector 72 receives the event data packets from the event locator circuit 68 and determines if any two of the detected events are in coincidence. Coincidence is determined by a number of factors. First, the time markers in each event data packet must be within a predetermined time period, for example, 12.5 nanoseconds, of each other. Second, the line-of-response (LOR) formed by a straight line joining the two detectors that detect the coincidence event should pass through the field of view in the PET imaging system 12. Events that cannot be paired are discarded. Coincident event pairs are located and recorded as a coincidence data packet that is communicated through a physical communication link 78 to a sorter/histogrammer 80 in the image reconstruction processor 50.

The image reconstruction processor 50 includes the sorter/histogrammer 80. During operation, sorter/histogrammer 80 generates a data structure known as a histogram. A histogram includes a large number of cells, where each cell corresponds to a unique pair of detector crystals in the PET scanner. Because a PET scanner typically includes thousands of detector crystals, the histogram typically includes millions of cells. Each cell of the histogram also stores a count value representing the number of coincidence events detected by the pair of detector crystals for that cell during the scan. At the end of the scan, the data in the histogram is used to reconstruct an image of the patient. The completed histogram containing all the data from the scan is commonly referred to as a "result histogram." The term "histogrammer"

generally refers to the components of the scanner, e.g., processor and memory, which carry out the function of creating the histogram.

The image reconstruction processor 50 also includes a memory module 82, an image CPU 84, an array processor 86, and a communication bus 88. During operation, the sorter/histogrammer 80 counts all events occurring along each projection ray and organizes the events into 3D data. This 3D data, or sinogram, is organized in one exemplary embodiment as a data array 90. Data array 90 is stored in the memory module 82. The communication bus 88 is linked to the communication link 52 through the image CPU 84. The image CPU 84 controls communication through communication bus 88. The array processor 86 is also connected to the communication bus 88. The array processor 86 receives data array 90 as an input and reconstructs images in the form of image array 92. Resulting image arrays 92 are then stored in memory module 82.

The images stored in the image array 92 are communicated by the image CPU 84 to the operator workstation 46. The operator workstation 46 includes a CPU 94, a display 96, and an input device 98. The CPU 94 connects to communication link 52 and receives inputs, e.g., user commands, from the input device 98. The input device 98 may be, for example, a keyboard, mouse, a touch-screen panel, and/or a voice recognition system, and so on. Through input device 98 and associated control panel switches, the operator can control the operation of the PET imaging system 12 and the positioning of the patient 22 for a scan. Similarly, the operator can control the display of the resulting image on the display 96 and can perform image-enhancement functions using programs executed by the workstation CPU 94.

The detector ring assembly 40 includes a plurality of detector units. The detector unit may include a plurality of detectors, light guides, scintillation crystals and analog application specific integrated chips (ASICs). For example, the detector unit may include twelve SiPM devices, four light guides, 144 scintillation crystals, and two analog ASICs.

Figure 3:
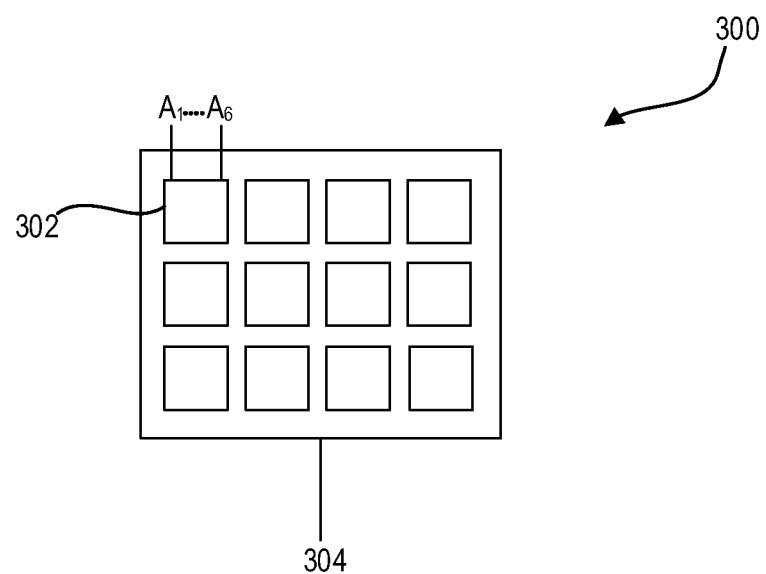
FIG. 3 is a schematic block diagram of the SiPM, according to an embodiment of the invention.

An example detector with a plurality of SiPMs is shown in FIG. 3. As such, each SiPM may further include a plurality of pixels (6, for example). An example where the detector unit 300 includes twelve SiPMs is shown in FIG. 3. In such an example, each SiPM 302 includes plurality of pixels. For example, the SiPM 302 may include 6 pixels. As such the detector unit 500 then includes a total of 72 pixels (determined by 6×12). In the detector unit 300, a common cathode bias 304 is typically applied to all the 72 pixels, for example. However, each of the pixel includes its own anode bias ($A_1$ through $A_6$ for SiPM 302) adjustment via the ASIC, for example. Thus, in the example detector unit 500, there is one cathode bias adjustment and 72 anode adjustment. As such, the application of the cathode bias 304 and the plurality of anode biases (72, for example) may be controlled by the controller (such as controller 44 of FIG. 2). In some examples, the application and adjustment of the biases may be accomplished by one or more of processors and controllers of the imaging system. For examples, the application and adjustment of the bias may be performed by one or more of controller 44, processor 86 and controller 54. The controller may further adjust the voltage bias applied to the cathode and anode by adjusting a circuit that further controls the voltage bias applied to the cathode and anode by adjusting one or more of resistors, amplifiers, etc. In some examples, the controller may adjust the voltage bias applied to the cathode and anode via Application Specific Integrated Circuits (ASICs).

As described earlier, the SiPM operates at above its breakdown voltage, and the SiPM gain is dependent on the over-voltage, wherein the over-voltage is the difference between the operating voltage and the breakdown voltage. Thus, as the over-voltage increases, the output of the SiPM increases.

As explained earlier, the energy events generated have a specific energy signature (such as 511-keV, for example) and the detectors are typically tuned such that data collection is normalized for the energy events. Examples of such detectors include silicon photomultiplier (SiPM) devices and these devices are calibrated to detect these energy events. Herein, a common cathode bias is typically applied to all the pixels of the SiPM, and the common cathode bias is calibrated to operate the SiPM a few volts above a breakdown point (so-called Geiger-mode operation). When photons are incident on the SiPM, the charges from the individual pixels are summed together to generate the response of the SiPM. However, the breakdown voltage of the SiPM widely varies depending on the production process and further depends on raw wafer material, impurity doping profile and process, etc. For example, planar process-based SiPM exhibits a 60V to 80V range in breakdown voltage. Hence a single cathode bias cannot be applied to all the SiPM devices used in the detector, and each SiPM device needs to be calibrated to determine the breakdown voltage and hence the cathode bias.

As described earlier, the typical calibration process includes applying a coarse cathode bias to detect the 511-keV events within a calibration histogram window, and then fine tune both the cathode and anode biases. As such, the coarse cathode calibration is performed by detecting energy peaks with multiple user interventions as described earlier. The process may take as long as 30-40 min to complete. As described further herein, cathode calibration may be automated by looking at total energy events detected as a function of cathode bias (as opposed to energy spectrum that is typically measured).

Plot 400 of FIG. 4 shows an example relationship between total number of events detected by the detector and a cathode bias. Specifically, plot 400 shows the total number of events that occurred within any particular time period. Cathode bias is shown along the horizontal axes, and the total number of events detected per time interval is shown along the vertical axes. As such, moving from right to left along the X-axis, indicates increasing cathode bias (and gain of the detector), and moving from bottom to top along the Y-axis, shows increasing events captured by the detector. Herein the gain of the detector is determined as a difference between the cathode bias and an anode bias.

Curve 402 is a calibration curve for a first detector block or unit, and curve 404 is the calibration for a second detector block or unit. As such, each detector unit includes a plurality of detectors, light guides, scintillation crystals and analog application specific integrated chips (ASICs) as explained earlier. For example, the detector unit may include twelve SiPM devices, four light guides, 144 scintillation crystals, and two analog ASICs. The cathode calibration is performed for each of the detector units. Cathode calibration for two such detector units are represented by curves 402 and 404.

Initially, the anode bias is set to a predetermined value based on a desired gain, for example. In one example, the anode bias for all the SiPMs may be set to a mid-range value, for example. The anode bias may be additionally or alternatively set to one-half of the anode adjustment rage, for example (anode bias may be set to 1V when the adjustment range is 2V, for example). Furthermore, the cathode bias is set to $V_0$, which is typically set to a low bias that covers breakdown voltage variation as mentioned above (thus low gain) such that none of the detectors detect any event. For example, if the minimum expected breakdown voltage in planar process variation is 64V, $V_0$=62V would be a good starting bias with enough margin. In other words, when the cathode bias is set to $V_0$, the detector does not capture any events, hence the number of events detected is close to zero, for example. Now, when the cathode bias is slowly increased from $V_0$ to $V_1$ (again, moving from right to left along the X-axis), the detector starts detecting events, depicted as an increase in the number of events detected. The time interval may be set to 1 second, for example. The cathode bias is typically increased by larger amounts (say by 100 DAC, where 100 DAC corresponds to 500 mV, for example), until the detector starts capturing events, that is until $V_1$ is reached. Increasing cathode bias further results in more events being captured, as indicated between $V_1$ and $V_2$, for example. As such, when the cathode bias reaches $V_2$, 511 keV events start showing up in energy histogram. The number of events detected continues increasing with the bias, as shown by an increase in events detected (curve 402) of plot 400. However, once events are detected, the cathode bias is increased by smaller amounts. That is, beyond $V_1$, the cathode bias is increased by say 10 (10 DAC corresponds to 50 mV) as opposed to 100, for example. As such, the coarse increments of cathode bias from $V_0$ to $V_1$ (100, for example) and the fine increments beyond $V_1$ (10, for example) may be further adjusted based on a required speed of the calibration. Herein, smaller increments tend to make the calibration procedure slower, and larger increments make the procedure faster.

The number of events detected between $V_2$ and $V_5$ may be used to determine a cathode calibration bias as explained below. As the bias increases between $V_2$ and $V_5$, the number of events initially starts increasing, as indicated by the increase in the number of events detected. The number of events continues to increase until $V_4$. At $V_4$, the number of events reaches its maximum. After $V_4$, the number of events decreases. The cathode bias $V_4$ corresponds to the maximum peak count 406 for the detector and is used to calculate its cathode bias. For example a certain offset value can be subtracted from $V_4$ to calculate its cathode bias. Due to statistical variation in the number of events detected, a small step (10, for example) ensures to find the maximum count and its corresponding bias. Also, naturally, the event count would vary with its energy thresholds. In some other examples, the threshold may be further based on the energy thresholds. When the cathode bias in increased beyond $V_4$, the number of events detected begins to drop, as seen as a decrease in curve 402 (between $V_4$ and $V_5$, for example). As explained earlier, when the bias is increased, the gain of the SiPM is also increased. However, at some point the gain becomes too high and the events start dropping out of the energy histogram. When this occurs, the number of events detected begin to decrease, as shown in curve 402.

When the number of events drops to a threshold 408, then the calibration curve has reached a roll-over point. For example, when the number of events is a 30% of the maximum number of events detected, then it is determined that the roll-over point is reached. Once the roll-over point is reached, then a desired cathode calibration or a starting parameter value is determined based on the cathode bias of the maximum peak count 406. For example, the desired calibration may be set as $V_3$, for example. $V_3$ may be determined as $V_4$-C, where C is a constant that is empirically derived and stored in a configuration file, for example.

The constant C may be an offset value that may be adjusted for all detectors in production. For example, C may be equal to 50 mV. In a similar way, the cathode calibration is performed for each of the detector units in the detector. For example, the line 404 in FIG. 4 for a different detector may show a different maximum in total count and so, different corresponding $V_4$. So, the detector may have a different $V_3$. By looking at the total number of events detected as opposed to measuring energy spectra, this calibration process may be completed within shorter time frames, for example within 2 minutes. Furthermore, by sampling for shorter times and repeating the sampling several times, repeatability and accuracy of cathode calibration may be enhanced.

FIG. 5 shows a high-level flow chart illustrating an example method 500 for determining a cathode calibration bias of the detector, according to an embodiment of the invention. In particular, method 500 relates to determining the cathode calibration bias based on the total number of energy events detected. Method 500 may be carried out using the systems and components described herein above with regard to FIGS. 1-3, for example the method may be stored as executable instructions in non-transitory memory 82 and executed by processor 86. However, it should be understood that the method may be carried out using different systems and components without departing from the scope of the disclosure.

Method 500 begins at 502, where it is determined if a cathode calibration of the detector is requested. As such, the detector may be a PET detector including plurality of SiPMs which require calibration. The SiPM calibration process is typically performed at the component level (during manufacturing of the detectors, for example), at the system level (when the detector is assembled into the imaging system, for example), or in the field (when an imaging module is replaced by a field service engineer or by a user, for example). If cathode calibration was requested at 502, the method 500 proceeds to 504, however, if cathode calibration was not requested, then method 500 ends.

At 504, method 500 includes determining if one or more of correction modules are turned off. For example, when the detector is being used in operation mode, there may be active compensation of the gain based on the level of signal detected. This may be performed by a compensation module, for example. However, when the cathode calibration is requested, any compensation that is otherwise applied to the detector gain is turned off. In some examples, it may further be checked if a health check module is turned off.

Next, at 506 the anode bias of the detector may be set to a desired value (1V or 143 DAC, for example). For example, the anode bias of the detector may be set to mid-scale to allow fine tuning either positive to negative from default value. In some examples, a digital number (DAC) corresponding to the anode bias may be set to 120 or 840 mV, for example. As such, the anode bias is applied to all of the plurality of pixels of the SIPM. The anode bias is determined based on a desired gain of the detector (herein, gain is the difference between the cathode bias and the anode bias). Then, the method proceeds to 508 where an initial cathode bias may be set so that no events will be detected. As shown in plot 400 of FIG. 4, the initial cathode bias may correspond to $V_0$ of curve 402 for example. For example, the initial cathode bias may be between 64V and 72V. This initial cathode bias may correspond to a DAC of about 2500, for example.

Continuing at 510, the cathode bias may be incrementally increased by a first step size or threshold amount thr1. The first threshold amount thr1 may be a first adjustment wherein first adjustment comprises increasing the cathode bias by a first step size until events are detected by the detector, for example. As an example, the cathode bias may be incremented by DAC of about 100 (which may correspond to a voltage increment of 500 mV, for example). As explained earlier, when the cathode bias is increased, the detector begins to detect events. As such, increasing the cathode bias includes automatic adjustment of the cathode bias by incremental steps, wherein the incremental steps are further adjusted based on the desired calibration speed. At 512, it may be checked if events are being detected by the detector. If events are still not being detected, then method 500 proceeds to 514, where the cathode bias may be continued to be increased by the threshold amount thr1 until events begin to get detected. Herein, during adjusting of the cathode bias, the cathode bias as such is held at each of the incremental cathode bias for a time duration, and the time duration is adjusted based on a desired calibration speed, for example.

If events are detected, then method 500 proceeds to 516, where the cathode bias increments may be reduced to a second step size or threshold amount thr2. The second threshold amount thr2 may be a second adjustment including increasing the cathode bias by a second step size until the number of events reaches the maximum number of events, wherein the first step size is larger than the second step size, and wherein the first step size is larger than the second step size. As an example, the cathode bias may be incremented by DAC of about 20 (which may correspond to a voltage increment of 100 mV, for example). Furthermore, a calibration curve of the total number of events detected per time interval as a function of the cathode bias may be generated at 518. As such, cathode calibration curves may be generated for each detector unit wherein the detector unit may include a plurality of SiPMs. Examples of such cathode calibration curves are shown in plot 400 by curves 402 and 404.

The method 500 then proceeds to 520 where it may be determined if the total number of events measured is decreasing. When the cathode bias or gain is increased, the number of events detected increases. However, when the gain is too high, the events begin to drop out of the energy histogram, and this may manifest as a decrease in the number of events detected in the calibration curve, for example. As such, this may be determined by comparing (or determining the difference of) the total number of events at a current cathode bias with the total number of events detected at an immediately preceding cathode bias setting. As such, if the difference is a negative number, then it may indicate that the total number of events is decreasing. However, if the difference is a positive number, then the total number of events is increasing, and the method 500 proceeds to 522 where the cathode bias may be continued to be increased by smaller increments (e.g., second threshold amount thr2), and method 500 returns to 520.

If the total number of events is decreasing when checked at 520, then method 500 proceeds to 524 where a peak in the calibration curve may be determined. The peak may be determined based on the calibration curve by determining the point on the curve where the events just being to decrease. The peak comprises a maximum number of events. In addition, the cathode bias may further be incremented by smaller finer amounts and the corresponding events detected may be continued to be monitored at 526. Next, at 528 it may be determined if the calibration curve (or the events) has rolled-over. For example, if the total number of events decreases to a fraction of the peak of the total number of events, then the curve is said to be rolled-over. As an example, if the total number of events drops by 30% of the peak count, then the curve is said to be rolled over. If the curve is not rolled-over, then method 500 returns to 524 where the total number of events continues to be detected as the cathode bias is increased.

However, if the events have rolled over, then the method 500 proceeds to 530, where the adjustments to the cathode bias may be ceased. Furthermore, a cathode calibration bias or a starting value of cathode bias may be determined based on the peak count bias of the cathode calibration curve, for example. As such, the cathode calibration bias value may be further depend on a target energy channel, for example. The calibration bias value at the peak may then be used to determine the desired over voltage by subtracting a fixed voltage (50 mV for example), the value of which is stored in a configuration file, from the peak detected voltage to determine the cathode calibration bias of the detector. Further still, at 532 the determined cathode calibration bias value may be written to a calibration file stored in memory, and may be further retrieved and used at the start of every scan, for example. As such, the cathode calibration bias is an initial starting point value that is retrieved during operation of the detector. However, both the anode and the cathode bias are further fine-tuned during operation of the imaging system based on the desired results. Method 500 then ends.

The method 500 may be performed for each detector unit or block. Each detector unit may include a plurality of SiPMs, for example. Hence the calibration method 500 may be repeated for each of the detector units in the detector. In this way, by looking at the number of energy events as opposed to energy spectra, faster cathode calibration procedure may be enabled. As such, this method is based on the single event count rate at the detector. Collected calibration data typically includes coincidence-resolved singles (that is, singles that formed a coincidence pair with a single from another detector). Since the single rate on the detector as shown in method 400 does not require coincidence with events from other working detectors, the method may be used with or without a PET source, for example. The method may be performed using intrinsic signals that result from the crystal (such as Lutetium crystal) in the PET detector. The method 500 may be performed offline (on a host computer, for example) or online (via event processing electronics, for example).

FIG. 6 shows a high-level flow chart illustrating an example method 600 for performing cathode calibration when the detector is in calibration mode and in operation mode, according to an embodiment of the invention. In particular, method 600 relates to performing additional measures when the cathode calibration is requested during the operation mode as opposed to when the detector is in calibration mode. Method 600 may be carried out using the systems and components described herein above with regard to FIGS. 1-3, for example the method may be stored as executable instructions in non-transitory memory 82 and executed by processor 86. However, it should be understood that the method may be carried out using different systems and components without departing from the scope of the disclosure.

Method 600 begins at 602, where it is determined if a cathode calibration of the detector is requested. As such, the detector calibration process is typically performed at the component level (during manufacturing of the detectors, for example), at the system level (when the detector is assembled into the imaging system, for example), or in the field (when an imaging module is replaced by a field service engineer or by a user, for example). In addition, if a user is not satisfied with the cathode calibration settings, the user may request the cathode calibration to be performed. If cathode calibration was requested at 602, the method 600 proceeds to 604. However, if cathode calibration was not requested, then method 600 ends.

At 604, it may be checked if the detector is in calibration mode. As such, when the detector is newly manufactured, or when the detector is newly assembled into the imaging system, or if the imaging module has been recently replaced, then the detector is considered to be in calibration mode. If the detector is in calibration mode, then method proceeds to 616, where similar to the method explained with reference to FIG. 5, the cathode bias may be adjusted. Briefly, the cathode bias may be initially set to a low value where no events are detected, and then the cathode bias may be incremented (coarsely) until events are detected by the detector. Once events are detected, the cathode bias is incremented by smaller (finer) amounts until the calibration curve rolls over.

Next at 618, it may be determined if the calibration curve has rolled-over. Herein, the roll-over refers to the number of events decreases to a fraction of the peak of the total number of events detected. If the calibration curve has not rolled-over, then method 600 proceeds to 620 where the cathode bias may be continued to be adjusted as described at 616 and the method returns to 618. However, if the calibration curve has rolled over, then the method 600 proceeds to 622 where the cathode calibration voltage or a starting value of cathode bias may be determined as described herein above with regard to method 500, for example. Briefly, the cathode calibration voltage may be determined based on the peak of the cathode calibration curve, for example, with an offset. The offset may be further optimized depending on variation among all production detectors and a target energy channel, 511 keV peak in energy histogram. As mentioned earlier, the calibration bias value at the peak may be used to determine the desired over voltage by subtracting a fixed voltage (50 mV for example), the value of which is stored in a configuration file, from the peak detected voltage to determine the cathode calibration bias of the detector. Next at 624, the determined cathode calibration voltage may be written to a calibration file stored in memory, and may be further retrieved and used at the start of every scan, for example. The method 600 then ends.

However, if the detector is not in calibration mode, when checked at 604, then method 600 proceeds to 606 where it is determined if the detector is in operation mode. When the detector has been in imaging mode, then it may be considered to be in operation mode. As such, when the detector is not newly manufactured, or newly installed in the imaging system, or not in calibration mode, then the detector may be considered to be in operation mode. However, if the detector if not in operation mode, when checked at 606, then method 600 proceeds to 608, where the user may input the mode and the method returns to 604.

If the detector is in operation mode, then method 600 proceeds to 610 where the detector may be set to calibration mode. Setting the detector to calibration mode may further include, turning off one or more of correction or compensation or health check modules at 612. In addition, the anode bias that is applied to the plurality of the pixels of the SiPMs may be set to a desired value at 614.

As mentioned earlier, when the detector is being used in detecting mode, there may be active compensation of the gain based on the level of signal detected. This may be performed by a compensation module, for example. However, when the cathode calibration is requested, any compensation that is otherwise applied to the detector gain is turned off. In some examples, a health check module may also be turned off. Typically when the detector is used to detect events, the health check monitor periodically checks if events are being detected. If no events are detected during imaging, the health check monitor may warn the user about possible issues with the imaging system. However, when the cathode calibration is performed, there are intervals when no events are detected. For example, in FIG. 4, when the initial cathode bias is at $V_0$, there are no events detected as shown in curve 402. If the health check module is left ON, then it may lead to unnecessary warnings and issues, hence the health check module is typically turned OFF while initiating the cathode calibration.

Next the method proceeds to 616 where the cathode bias is adjusted as explained earlier. The method 600 performs the procedure described from 618 to 624 as described earlier. In this way, the cathode calibration procedure may be performed when the detector is in calibration mode and in operation mode. In both modes, the cathode calibration is determined based on the total number of events detected as a function of cathode bias. Method 600 then ends. As such, the method 600 may be performed offline (on a host computer, for example) or online (via event processing electronics, for example).

A technical effect of this disclosure includes the automatic calibration of a cathode bias of a detector based on a number of events detected. The technical effect of generating a cathode calibration curve based on the total number of events as opposed to energy spectra, is that the calibration procedure may be completed fairly quickly. In addition, the entire calibration procedure is further automated with minimal user intervention.

The systems and methods described above provide for a method of cathode calibration, the method comprising incrementally adjusting a cathode bias of a detector while maintaining an anode bias of the detector at a desired value and counting a number of events detected at each incremental cathode bias, the events corresponding to a photon energy detected by the detector and calibrating a cathode bias set point of the detector based on a cathode bias producing a maximum number of events.

In a first example, the adjusting may additionally or alternatively include the cathode bias being held at each of the incremental cathode bias for a time duration, the time duration is adjusted based on a desired calibration speed. A second example of the method optionally includes the first example and further includes wherein the adjusting includes automatic adjustment of the cathode bias by incremental steps, the incremental steps are further adjusted based on the desired calibration speed. A third example of the method optionally includes one or more of the first and the second examples, and further includes wherein incrementally adjusting the cathode bias includes a first adjustment and a second adjustment of the cathode bias, wherein the first adjustment comprises increasing the cathode bias by a first step size until events are detected by the detector, and the second adjustment comprises increasing the cathode bias by a second step size until the number of events reaches the maximum number of events, wherein the first step size is larger than the second step size. A fourth example of the method optionally includes one or more of the first through the third examples, and further includes wherein the cathode bias is further adjusted until a threshold number of events is detected, the threshold number of events lower than and based on the maximum number of events, and wherein incrementally adjusting the cathode bias ceases when the number of events detected reaches the threshold number of events. A fifth example of the method optionally includes one or more of the first through the fourth examples, and further includes wherein the adjusting of the cathode bias is performed during a calibration mode of the detector and wherein the cathode bias set point comprises an initial bias that is further adjusted based on photon energy emitted from a sample. A sixth example of the method optionally includes one or more of the first through the fifth example, and further includes wherein the anode bias is further based on one or more of a desired average anode bias voltage and a desired gain of the detector. A seventh example of the method optionally includes one or more of the first through the sixth examples, and further includes wherein the detector is a silicon photomultiplier (SiPM). An eighth example of the method optionally includes one or more of the first through the seventh examples, and further includes wherein the photon energy detected corresponds to 511 keV.

The systems and methods described above also provide for a method of cathode calibration, the method, comprising setting an initial cathode bias of a silicon photomultiplier (SiPM) to a value where no events are detected by the SiPM, events referring to 511 keV gamma ray events, counting the events detected over a time period, increasing the cathode bias until the events detected by the SiPM reaches a roll-over point on the curve, the roll-over point further based on a total number of events detected by the SiPM, and determining a starting set point cathode bias of the SiPM based on the events. In a first example of the method, the method may additionally or alternatively include wherein the counting includes determining a sum total of the events detected at the cathode bias. A second example of the method optionally includes the first example, and further includes wherein increasing the cathode bias further includes increasing the cathode by a first amount until the events are detected in the SiPM, and subsequently increasing the cathode bias by a second amount until the roll-over point is reached, the second amount smaller than the first amount. A third example of the method optionally includes one or more of the first and the second examples, and further includes setting an anode bias of the SiPM to a predetermined value based on a desired gain. A fourth example of the method optionally includes one or more of the first through the third examples, and further includes wherein the gain of the SiPM is determined as difference between the cathode bias and the anode bias. A fifth example of the method optionally includes one or more of the first through the fourth examples, and further includes wherein the starting set point cathode bias of the SiPM is a configuration parameter of the SiPM that is used in a calibration mode of the SiPM, and is further adjusted during operation mode of the SiPM.

The systems and methods described above also provide for a system comprising a silicon photomultiplier (SiPM) including plurality of pixels, a cathode bias applied to the plurality of pixels, an anode bias applied to each of the plurality of pixels, a processor, and a memory storing executable instructions that when executed cause the processor to perform cathode calibration by adjusting the cathode bias of the SiPM based on a total number of events occurring in the SiPM during a time period while maintaining the anode bias at a desired value, the events corresponding to photon energy detected by the SiPM, and determine a configuration parameter of the cathode bias of the SiPM. In a first example of the system, the system may additionally or alternatively include wherein the configuration parameter of the cathode bias is a starting cathode bias of the SiPM written to a calibration file of the SiPM and wherein the cathode bias is further adjusted during operation of the SiPM. A second example of the system optionally includes the first example and further includes prior to performing the cathode calibration, turning off one or more of a compensation module and a health-check module. A third example of the system optionally includes one or more of the first and the second examples and further includes wherein adjusting the cathode bias includes increasing the cathode bias by a first amount until the events are captured by the detector and subsequently, the adjusting includes a fine adjustment of the cathode bias wherein the cathode bias is increased by a second amount until the total number of events reaches a threshold number of events, the second amount smaller than the first amount. A fourth example of the system optionally includes one or more of the first through the third examples, and further includes wherein the first amount and the second amount are further adjusted based on a desired speed of the cathode calibration.

In one embodiment, a method comprises adjusting a cathode bias of a detector based on a total number of events occurring in the detector during a time period while maintaining an anode bias at a desired value, the events corresponding to photon energy detected by the detector. In a first example, the method further comprises sweeping the cathode bias across a range of voltages and counting a number of events detected for each cathode bias in the range to determine an optimal cathode bias corresponding to a maximum number of events. In a second example depending from the first example, adjusting the cathode bias comprises adjusting the cathode bias to the optimal cathode bias, and wherein the total number of events comprises the maximum number of events. In a third example, incrementally adjusting the cathode bias includes a first adjustment and a second adjustment of the cathode bias, wherein the first adjustment comprises increasing the cathode bias by a first step size until events are detected by the detector, and the second adjustment comprises increasing the cathode bias by a second step size until the number of events reaches the maximum number of events, wherein the first step size is larger than the second step size. In a fourth example, the cathode bias is further adjusted until a threshold number of events is detected, the threshold number of events lower than and based on the maximum number of events, and incrementally adjusting the cathode bias ceases when the number of events detected reaches the threshold number of events. In a fifth example, the adjusting of the cathode bias is performed during a calibration mode of the detector and wherein the cathode bias set point comprises an initial bias that is further adjusted based on photon energy emitted from a sample. In a sixth example, the anode bias is further based on one or more of a desired average anode bias voltage and a desired gain of the detector. In a seventh example, the detector is a silicon photomultiplier (SiPM). In an eighth example, the photon energy detected corresponds to 511 keV.

In another embodiment, a method comprises incrementally increasing a cathode bias of a detector while maintaining an anode bias of the detector at a desired value and counting a number of events detected at each incremental cathode bias, the events corresponding to a photon energy detected by the detector, and calibrating a cathode bias set point of the detector based on a cathode bias producing a maximum number of events. In a first example, while incrementally increasing the cathode bias, the cathode bias is held at each of the incremental cathode biases for a time duration, the time duration adjustable based on a desired calibration speed. In a second example, the cathode bias is initially set to a first voltage wherein no events are detected, and the cathode bias is incrementally increased from the first voltage to a second voltage, the second voltage comprising a roll-over point based on the maximum number of events. In a third example, the counting includes determining a sum total of the events detected at the cathode bias. In a fourth example, the method further comprises setting an anode bias of the detector to a predetermined value based on a desired gain. In a fifth example, the desired gain of the detector is determined as a difference between the cathode bias and the anode bias.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   adjusting a cathode bias of a detector based on a total number of events occurring in the detector during a time period while maintaining an anode bias at a desired value, the total number of events corresponding to photon energy detected by the detector; and
   sweeping the cathode bias across a range of voltages and counting a number of events detected for each cathode bias in the range of voltages to determine an optimal cathode bias corresponding to a maximum number of events.

2. The method of claim 1, wherein adjusting the cathode bias comprises adjusting the cathode bias to the optimal cathode bias, and wherein the total number of events comprises the maximum number of events.

3. The method of claim 2, wherein incrementally adjusting the cathode bias includes a first adjustment and a second adjustment of the cathode bias, wherein the first adjustment comprises increasing the cathode bias by a first step size until the number of events are detected by the detector, and wherein the second adjustment comprises increasing the cathode bias by a second step size until the number of events reaches the maximum number of events, wherein the first step size is larger than the second step size.

4. The method of claim 3, wherein the cathode bias is further adjusted until a threshold number of events is detected, the threshold number of events lower than and based on the maximum number of events, and wherein incrementally adjusting the cathode bias ceases when the number of events detected reaches the threshold number of events.

5. The method of claim 4, wherein the adjusting of the cathode bias is performed during a calibration mode of the detector and wherein a cathode bias set point comprises an initial bias that is further adjusted based on photon energy emitted from a sample.

6. The method of claim 1, wherein the anode bias is further based on one or more of a desired average anode bias voltage and a desired gain of the detector.

7. The method of claim 1, wherein the detector is a silicon photomultiplier (SiPM) and an initial bias voltage is selected to cover production variation of breakdown voltage.

8. The method of claim 1, wherein the photon energy detected corresponds to a gamma ray source energy of the detector.

9. A method, comprising:
   incrementally increasing a cathode bias of a detector while maintaining an anode bias of the detector at a desired value and counting a number of events detected at each incremental cathode bias, the number of events corresponding to a photon energy detected by the detector; and
   calibrating a cathode bias set point of the detector based on a cathode bias producing a maximum number of events.

10. The method of claim 9, wherein while incrementally increasing the cathode bias, the cathode bias is held at each of the incremental cathode biases for a time duration, the time duration adjustable based on a desired calibration speed.

11. The method of claim 10, wherein the cathode bias is initially set to a first voltage wherein no events are detected, and wherein the cathode bias is incrementally increased from the first voltage to a second voltage, the second voltage comprising a roll-over point based on the maximum number of events.

12. The method of claim 9, wherein the counting includes determining a sum total of the number of events detected at the cathode bias.

13. The method of claim 9, further comprising setting the anode bias of the detector to a predetermined value based on a desired gain.

14. The method of claim 13, wherein the desired gain of the detector is determined as a difference between the cathode bias and the anode bias.

15. A system comprising:
   a silicon photomultiplier (SiPM) including a plurality of pixels;
   a cathode bias applied to the plurality of pixels;
   an anode bias applied to each of the plurality of pixels;
   a processor; and
   a memory storing executable instructions that when executed cause the processor to:
      turn off one or more of a compensation module and a health-check module prior to performing a cathode calibration;
      perform the cathode calibration by adjusting the cathode bias of the SiPM based on a total number of events occurring in the SiPM during a time period while maintaining the anode bias at a desired value, the total number of events corresponding to photon energy detected by the SiPM; and determine a configuration parameter of the cathode bias of the SiPM.

16. The system of claim 15, wherein the configuration parameter of the cathode bias is a starting cathode bias of the SiPM written to a calibration file of the SiPM, and wherein the cathode bias is further adjusted during operation of the SiPM.

17. The system of claim 15, wherein adjusting the cathode bias includes increasing the cathode bias by a first amount until the total number of events is captured by the SiPM and subsequently, the adjusting includes a fine adjustment of the cathode bias wherein the cathode bias is increased by a second amount until the total number of events reaches a threshold number of events, the second amount smaller than the first amount.

18. The system of claim 17, wherein the first amount and the second amount are further adjusted based on a desired speed of the cathode calibration.

\* \* \* \* \*